Oct. 27, 1953

W. N. LINDSAY 2,656,845

APPARATUS FOR TESTING AND CONTROLLING
THE CONCENTRATION OF SOLUTIONS

Filed March 6, 1948

INVENTOR
WESLEY N. LINDSAY

BY
ATTORNEYS

Oct. 27, 1953
W. N. LINDSAY
2,656,845
APPARATUS FOR TESTING AND CONTROLLING
THE CONCENTRATION OF SOLUTIONS
Filed March 6, 1948
9 Sheets-Sheet 2
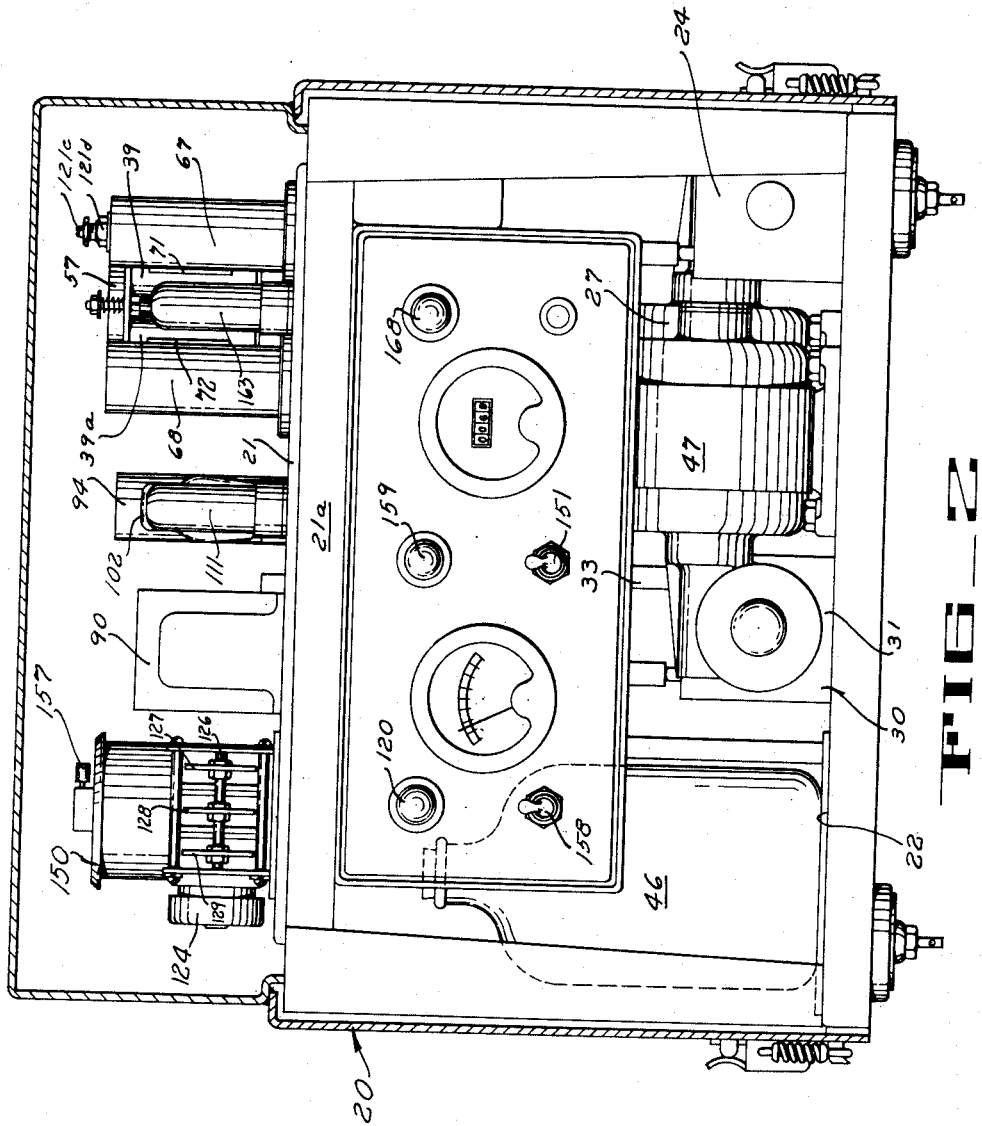
FIG_2
INVENTOR
WESLEY N. LINDSAY
BY Philip A. Minnie
Hans G. Hoffmeister
ATTORNEYS

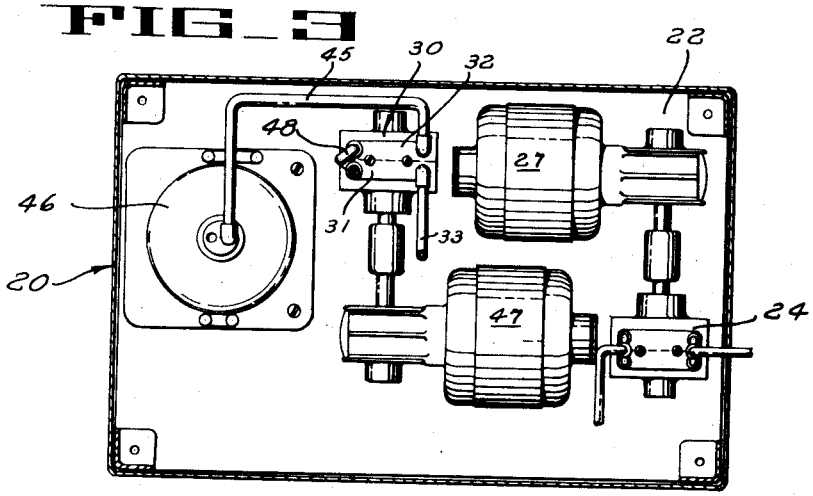
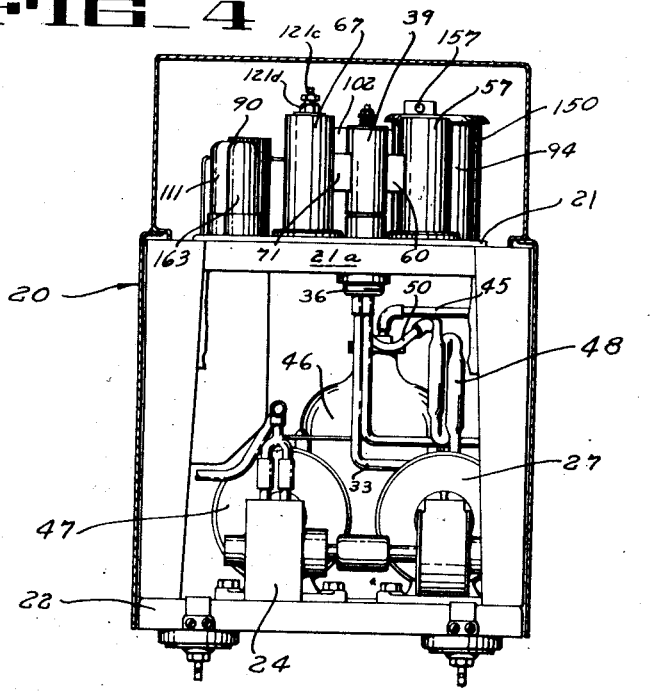

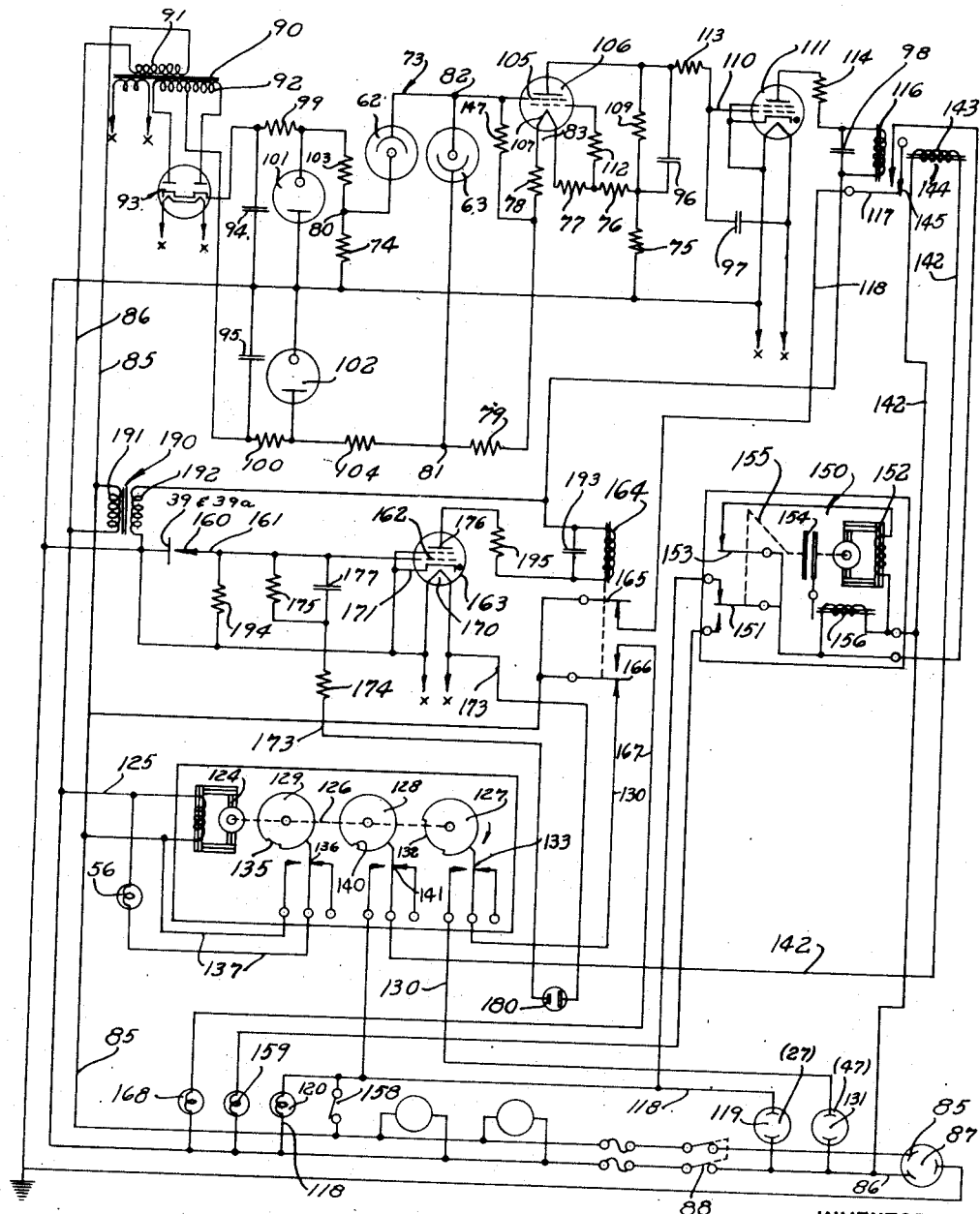

Oct. 27, 1953 W. N. LINDSAY 2,656,845
APPARATUS FOR TESTING AND CONTROLLING
THE CONCENTRATION OF SOLUTIONS
Filed March 6, 1948 9 Sheets-Sheet 5
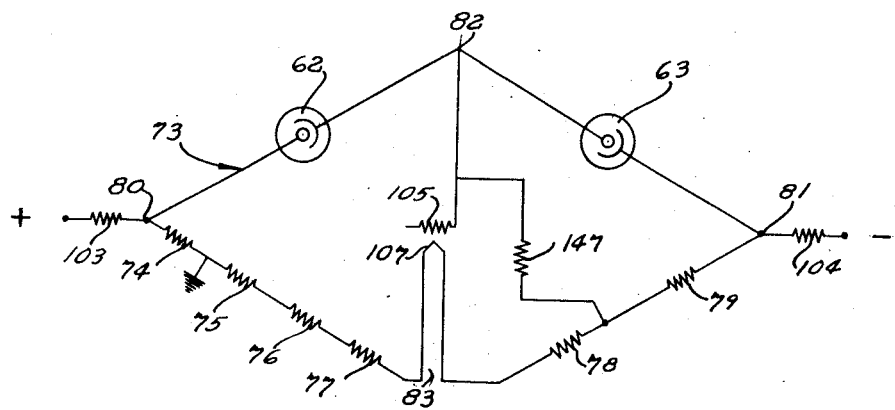
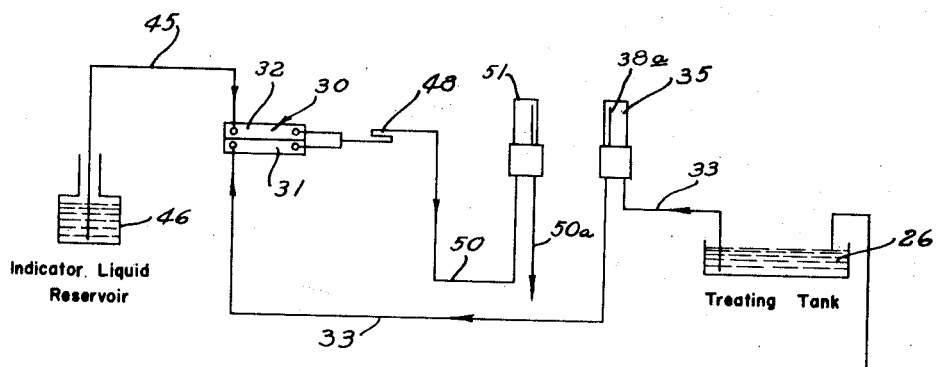
INVENTOR
WESLEY N. LINDSAY Oct. 27, 1953         W. N. LINDSAY           2,656,845
          APPARATUS FOR TESTING AND CONTROLLING
Filed March 6, 1948    THE CONCENTRATION OF SOLUTIONS
                                          9 Sheets-Sheet 6
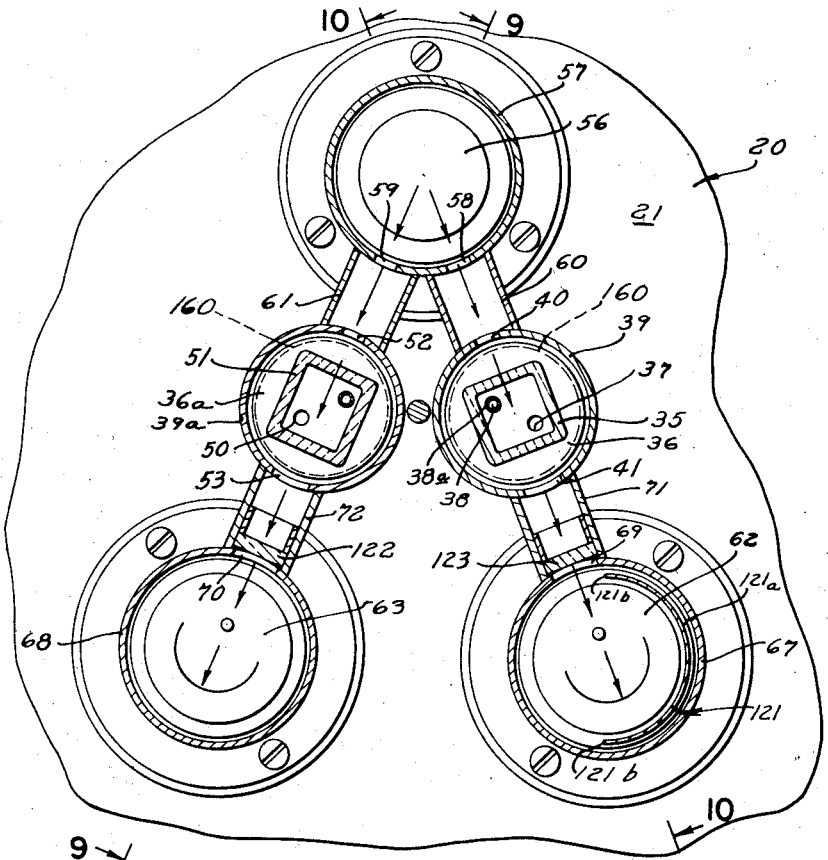
FIG_8
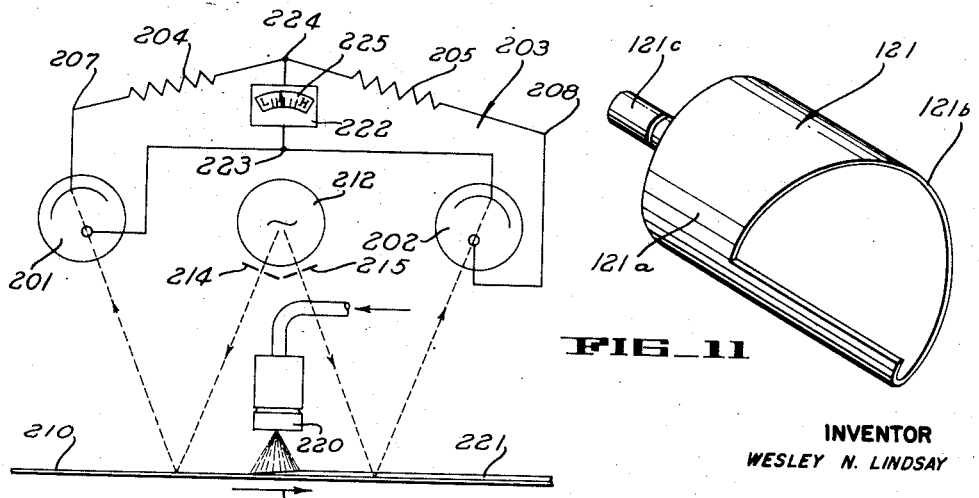
FIG_16        FIG_11
INVENTOR
WESLEY N. LINDSAY
BY
ATTORNEYS Oct. 27, 1953
W. N. LINDSAY
2,656,845
APPARATUS FOR TESTING AND CONTROLLING
THE CONCENTRATION OF SOLUTIONS
Filed March 6, 1948
9 Sheets-Sheet 7
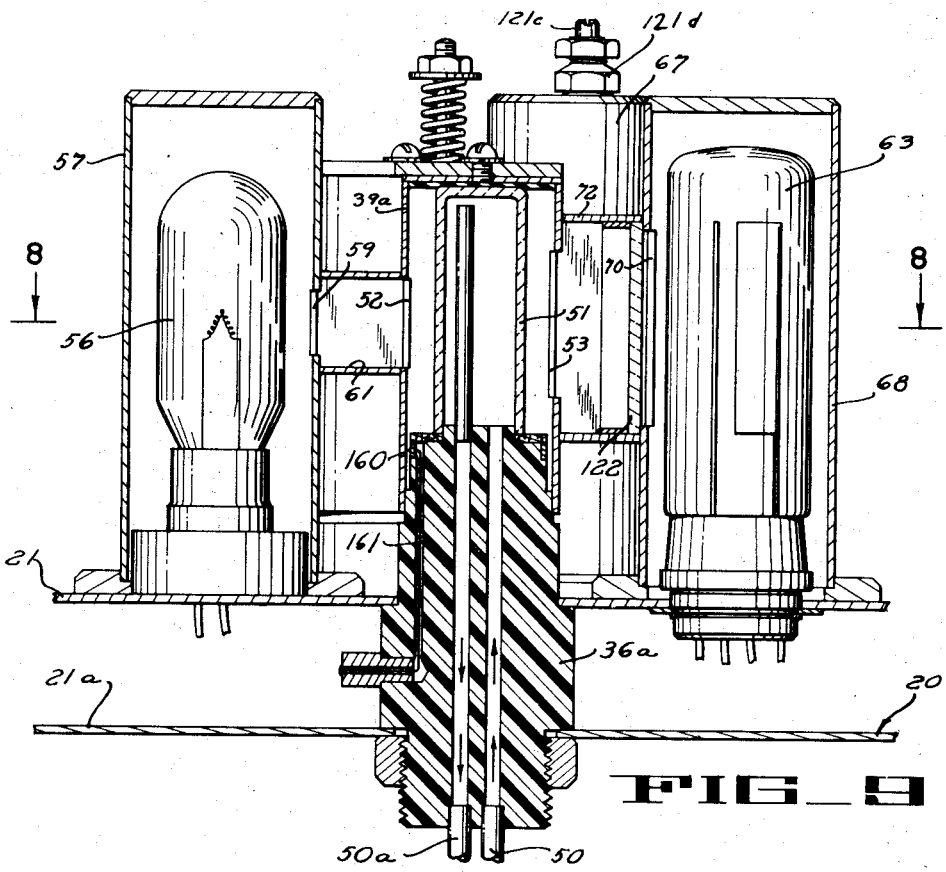
FIG_9
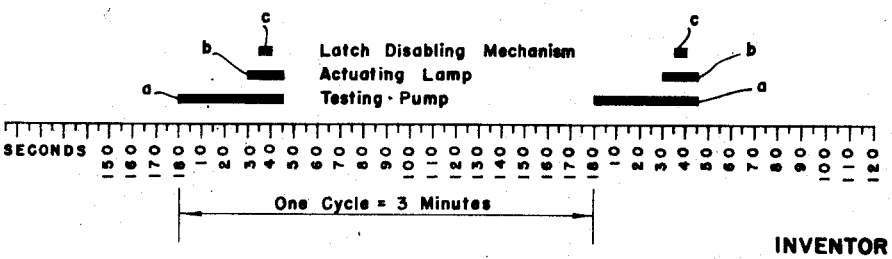
FIG_12
INVENTOR
WESLEY N. LINDSAY
BY
ATTORNEYS Oct. 27, 1953
W. N. LINDSAY
2,656,845
APPARATUS FOR TESTING AND CONTROLLING
THE CONCENTRATION OF SOLUTIONS
Filed March 6, 1948
9 Sheets-Sheet 8
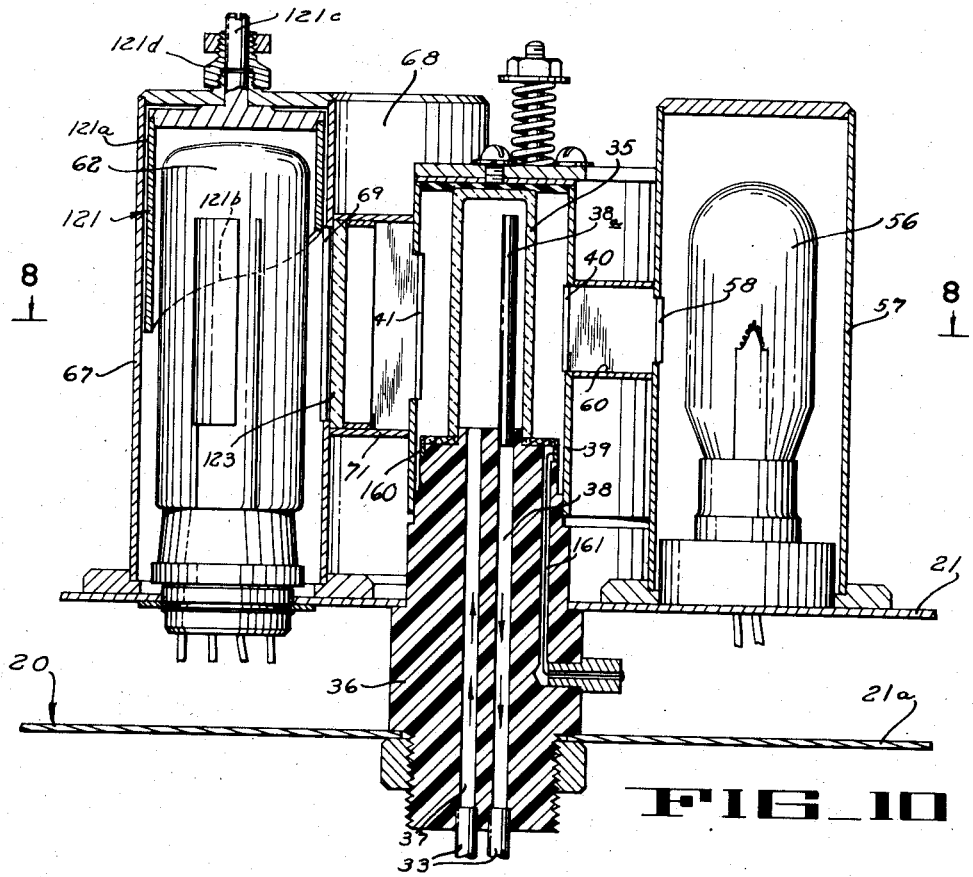
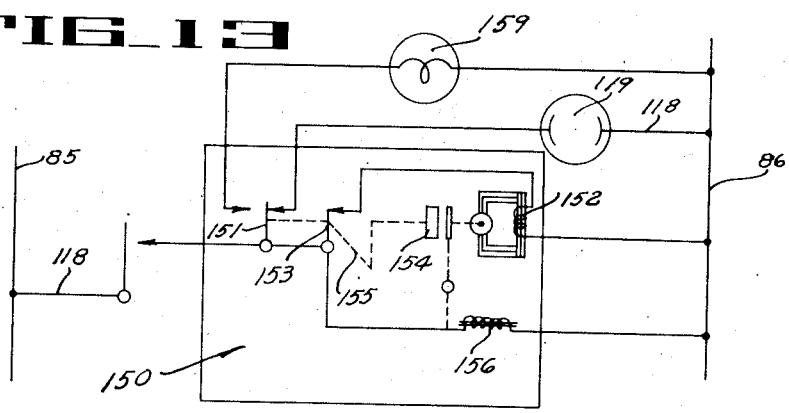
INVENTOR
WESLEY N. LINDSAY
ATTORNEYS

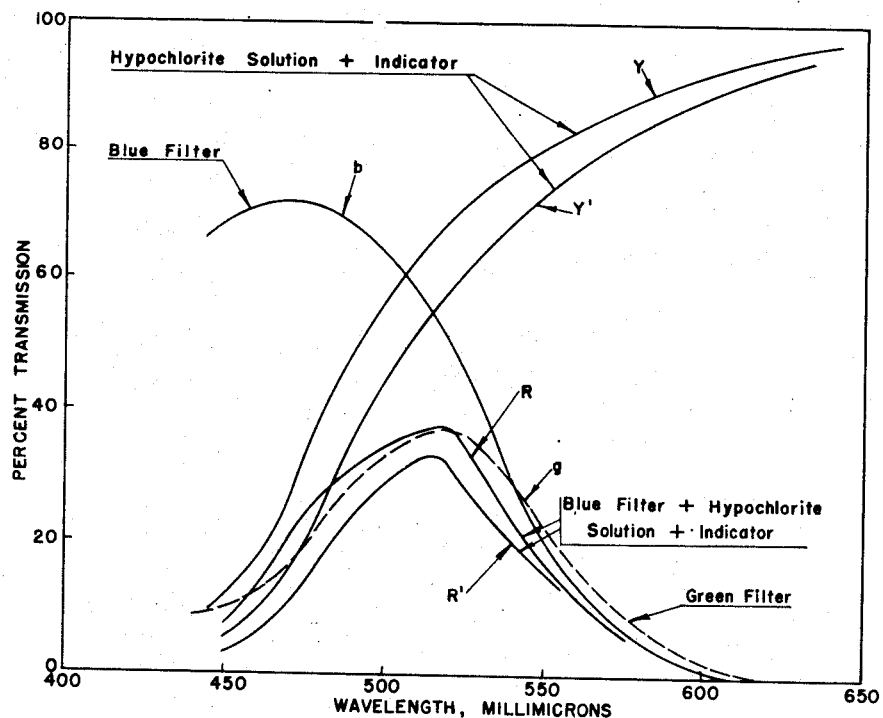
FIG_14
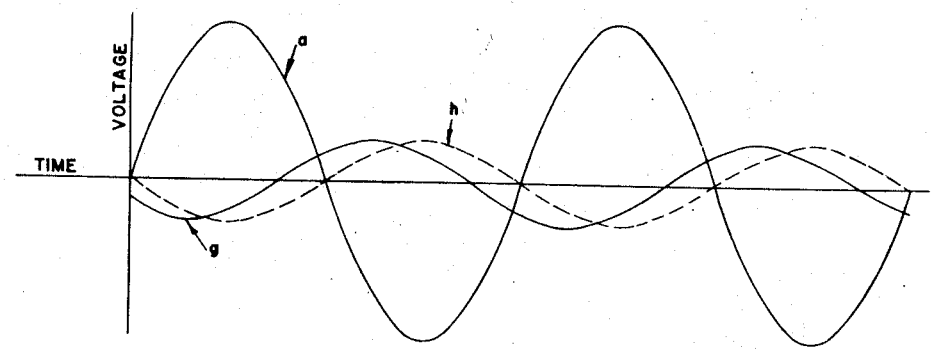
FIG_15
INVENTOR
WESLEY N. LINDSAY

Patented Oct. 27, 1953

2,656,845

UNITED STATES PATENT OFFICE 2,656,845

APPARATUS FOR TESTING AND CONTROLLING THE CONCENTRATION OF SOLUTIONS

Wesley N. Lindsay, San Jose, Calif., assignor to Food Machinery and Chemical Corporation, a corporation of Delaware Application March 6, 1948, Serial No. 13,468

11 Claims. (Cl. 137—93)

The present invention pertains to the art of controlling the concentration of solutions and is of particular utility in the treatment for destroying or retarding the growth of decay organisms in agricultural and horticultural produce.

In order to protect fruit or vegetables from the ravages of mold and decay during protracted storage and shipping periods, it is of advantage to treat them with solutions of suitable germicidal substances, such as sodium hypochlorite, orthophenylphenol, and the like. In practice, this is usually accomplished by conveying the produce through a shower of germicidal liquid emitted from a flooding device and, for reasons of economy, the surplus liquid draining from the produce is gathered in a tank and returned to the flooding device for renewed use.

In treating fruit and vegetables in this manner it is of great importance that the germicidal solution be at all times maintained at the proper strength because if the solution should be too weak the treatment would remain ineffective. On the other hand, if it should be too strong, it is liable to deleteriously affect the texture, taste, and appearance of the produce and thus impair its marketability.

To maintain the solution at its proper strength during repeated use it is evidently necessary to add new supplies of the germicidal substance at appropriate intervals. For this purpose it is customary to periodically add limited quantities of a concentrated solution of the germicidal substance to the treating solution employed. However, the rate at which the germicidal substance is consumed and requires replenishment varies greatly, depending upon the nature of the produce, the speed and continuity of the supply process, and the extent to which the produce is contaminated by dirt, and other foreign matter. Hence, it is evidently not possible to solve the problem by simply feeding a new supply of the concentrate at equal intervals into the tank, because depending upon any one of the above mentioned factors, such a procedure might render the treating liquid harmfully strong or leave it ineffectively weak.

It is, therefore, necessary to test specimens of the sterilizing liquid at periodic intervals to determine the concentration thereof and regulate the concentrate supply according to the results of these tests. In accordance with my invention this is accomplished by bringing specimens of the solution into contact with an indicator liquid which is adapted to vary the light-transmission of said solution to an extent determined by the relative quantity of the germicidal solute contained therein and conducting the colored mixture through the light beam of a photo-electric control system, which is arranged to start or stop operation of mechanism adapted to feed new quantities of the concentrate into the solution, depending upon the extent to which the solution has been colored, i. e., changed its ability of transmitting light upon contact with the indicator fluid.

It is an object of the invention to provide a simple, efficient, and dependable apparatus for automatically maintaining the concentration of a solution within predetermined limits.

Another object is to provide control mechanism, for sterilizing solutions of the type described, which is adapted to automatically increase the concentration of said solutions as soon as the relative quantity of the active agent contained therein drops below a predetermined lower limit.

Another object is to provide a control system, of the type referred to, having automatically acting mechanism for increasing the concentration of a solution and including means adapted to positively prevent excessive operation of said mechanism.

A further object is to provide a system adapted to control the concentration of a solution of the type characterized, which is arranged to automatically suspend its operation whenever part of its mechanism becomes defective.

Another object is to provide a system of the type referred to, which is arranged to automatically suspend its operation whenever its supply of indicator liquid is exhausted.

Another object is to provide a system, of the type characterized, with signaling means adapted to warn those in attendance whenever said system relinquishes its control over a solution regulated therewith.

Fruit and vegetables as harvested are frequently contaminated by dirt, and other foreign matter which may be taken up by the sterilizing solution, when the produce is treated in the manner described above, and which may be suspended in the liquid and impair the transparency thereof. This is liable to cause inappropriate operation of photo-electric control mechanism, of the type referred to, because the impurities suspended in the solution may have very much the same effect upon the light beam of a photo-electric control system as coloring produced by the interaction of the indicator liquid with the germicidal solute. As a result thereof, the photo-electric system may register poor transmission of the sterilizing liquid representative of high concentration and may suspend operation of the concentrate replenishing mechanism at a time when the concentration of the solution has dropped below its lower permissible limit. Fluctuations in the intensity of the light emitted by the lamps employed in photoelectric control systems of the type here under consideration, may cause similar misoperation of such systems and thus result in decay or destruction of large amounts of fruit and vegetables.

It is, therefore, another object of the present invention to provide a method for ascertaining variations in the light absorbing properties of an object which results from processing said object to alter its color, irrespective of variations in the light absorbing properties of said object in its natural condition.

It is still another object of the present invention to provide a photo-electric control apparatus that is capable of accurately indicating the condition of a tested substance, such as the concentration of a selected solute in a selected solvent, irrespective of the presence of other factors to which a photo-electric tube is apt to respond; in other words, the invention aims to furnish a testing apparatus adapted to provide compensation for incidental factors of a variable nature, such as are liable to cause misleading response in phototubes, in order that the control operation of the apparatus be truly representative of the condition of the selected substance or substances.

With particular reference to the task of controlling the concentration of a sterilizing solution for agricultural produce, it is an object of the present invention to provide a photo-electric concentration control system, of the type described, the control operation of which is reliable no matter how great the amount of impurities suspended in the tested solution may be and how much it may vary.

It is still another object of the present invention to provide means adapted to compensate for any variation in the intensity of the light beam impinging upon the light-sensitive components of photo-electrc control systems, which result from causes other than variations of the concentration of the tested solution.

These and other objects and advantages of the present invention will become apparent from the following description and the accompanying drawings which illustrate a preferred embodiment thereof and wherein:

Fig. 2 is a side elevation of the control unit shown in Fig. 1.

Fig. 3 is a plan view of the lower chassis of the control unit shown in Figs. 1 and 2.

Fig. 4 is an end view of the same control unit viewed in the direction of the arrows 4—4 of Fig. 1 with part of the chassis removed to expose details in the interior of the instrument.

Fig. 5 is a complete wiring diagram of a photo-electric concentration-control system embodying the present invention.

Fig. 6 illustrates part of the system shown in Fig. 5 with the symbols of certain of its components rearranged to facilitate an understanding of their functions.

Fig. 7 is a diagram illustrating the pipe system of the control unit of the invention, including the pumps and the light-transmitting cells employed therein.

Fig. 8 is a horizontal section of the photo-electric control mechanism proper taken along line 8—8 of Figs. 9 and 10.

Fig. 9 is a vertical section of the mechanism shown in Fig. 8 taken along line 9—9 thereof.

Fig. 10 is another vertical section similar to Fig. 9, taken along line 10—10 of Fig. 8.

Fig. 11 is a perspective view illustrating a shutter such as may be employed in the photo-electric control mechanism of the invention.

Fig. 12 is a timing diagram illustrating the duration and relative position of the operative phases of certain components of the concentration-control unit of the invention during two successive operative cycles thereof.

Fig. 13 is a wiring diagram illustrating one of the components employed in the control unit of the invention.

Fig. 14 is a diagram illustrating the effect of color filters in the photo-electric control system of the invention.

Fig. 15 is a diagram illustrating the phases of alternating voltages appearing on the electrodes of one of the electronic tubes employed in the system of the present invention.

Figure 1:
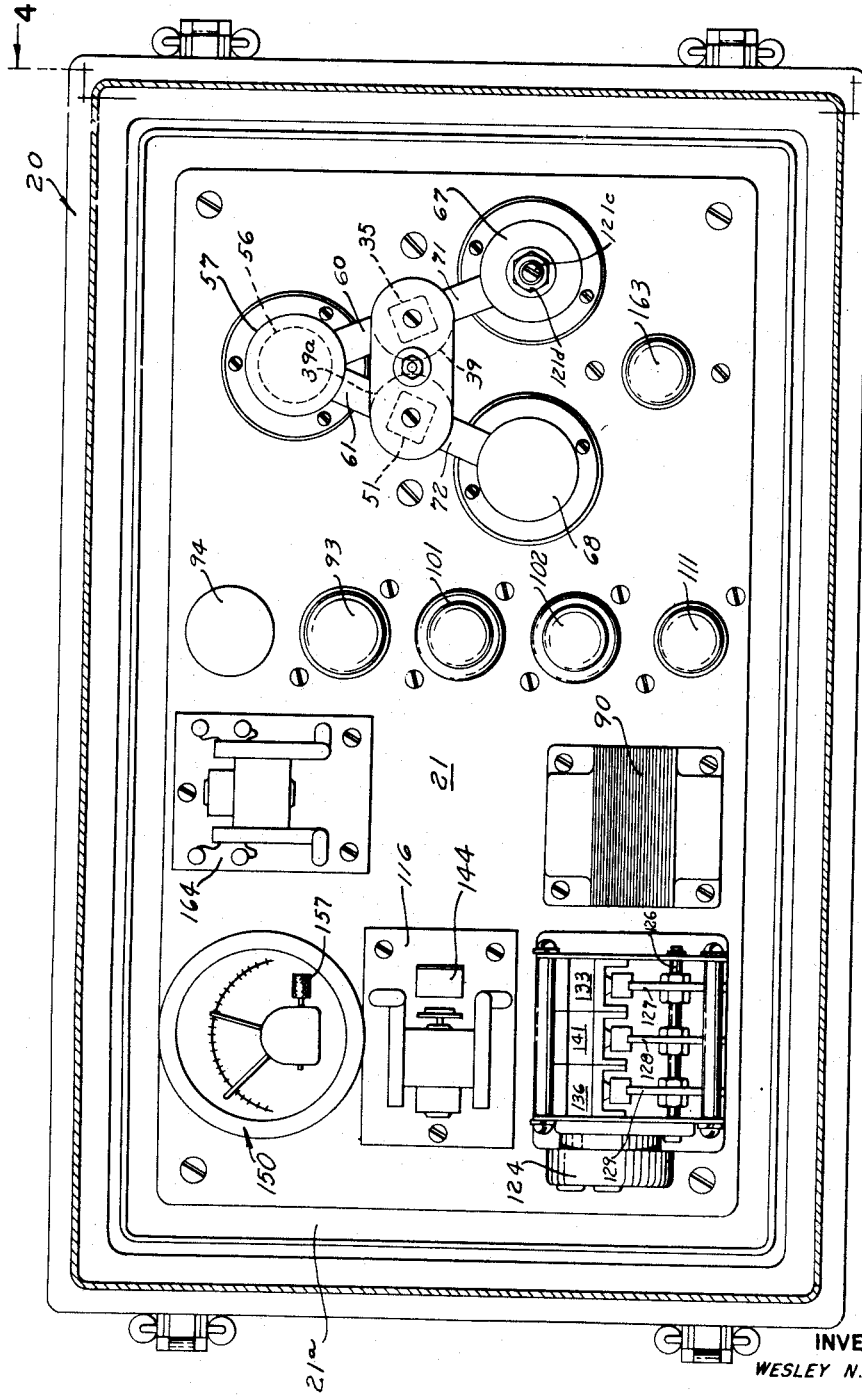
Fig. 1 is a plan view of the chassis of a practical embodiment of the present invention with the cover shown in section.

Fig. 16 diagrammatically illustrates a modified embodiment of a photo-electric control apparatus constructed in accordance with my invention.

In practice, the various devices employed in accordance with the present invention to automatically control the concentration of a solution, are preferably combined into a compact portable unit which may take the form of a box or case 20 containing an upper and a lower chassis 21 and 22, respectively, as shown in Figs. 1, 2, 3, and 4. Mounted upon the lower chassis 22 is a pump 24 which is adapted to deliver a concentrated solution of the germicidal substance from a suitable reservoir 25 into the treating tank 26 as diagrammatically indicated in Fig. 7. The pump 24 may be of the rotary type comprising two cooperating pumping units mounted upon a common shaft which is actuated by an electric motor 27, that is arranged upon the lower chassis 22.

The lower chassis 22 of the control unit carries another pump 30 (Figs. 2, 3, and 7) which comprises two ganged pumping units 31 and 32 that have separate intake ports. A pipe line 33 connects the treating tank 26 through a transparent cell 35, to be referred to as compensating cell hereinafter, to the intake port of the pumping unit 31 (Fig. 7) so that the pump 30 may draw specimens of the treating solution through said cell 35. This cell 35 is in the form of an inverted receptacle of rectangular cross section and may be made of Pyrex glass, or any other suitable material of a transparent nature. The cell 35 is securely mounted with its open end upon a base or pedestal 36 of insulating material, such as the plastic known under the trade-name of "Lucite."

The pipe line 33 (Fig. 10) communicates with the hollow interior of the cell 35 through an inlet channel 37 which terminates at the level of the upper surface of the pedestal 36, and an outlet channel 38 which is provided with an upwardly extending outlet pipe 38a that reaches closely to the ceiling of the receptacle. The bottom portion of the base 36 is preferably threaded so that the cell may be positioned by the upper chassis 21 of the control unit 20 and clamped rigidly to the upper tray 21a which supports chassis 21. The transparent cell 35 is encased in cylindrical metal shell or housing 39 which may be of stainless steel. Said shell is detachably positioned by the base 36, as shown, and possesses two rectangular windows 40 and 41 in its cylindrical wall at diametrically opposite points thereof.

A pipe 45 (Fig. 7) connects the intake port of the second unit 32 of the testing pump 30 to a suitable reservoir, such as the bottle 46, shown in Figs. 2 and 7, which contains an indicator liquid of the type adapted to produce color formation in whatever particular sterilizing liquid may be employed. For instance, if the sterilizing liquid is an aqueous solution of sodium hypochlorite, a concentrated solution of acidified sodium iodide may be used as indicator liquid because sodium hypochlorite and sodium iodide interact to free iodine which causes discoloration of the resultant mixture to any one in range of different color shades from a pale lemon yellow to a deep reddish brown, depending upon the amount of sodium hypochlorite present in the solution. As an alternative, orthotolidine may be used instead of the sodium iodide and will be of particular advantage, whenever very weak solutions of sodium hypochlorite are to be tested because of its tendency to readily form yellow color in the presence of very minute quantities of sodium hypochlorite. It will be understood, however, that the present invention is neither limited to any particular indicator liquid nor, in fact, to any particular sterilizing solution, but may be employed to control the concentration of any kind of solution and will operate with any substance capable of producing color in the solution to be tested.

The pump 30 (Fig. 3) is preferably of the rotary type with the rotors of the two units being mounted upon a common shaft for operation in unison, and said common shaft is driven by an electric motor 47 mounted upon the lower chassis 22 of the control unit 20 and arranged to operate at equal intervals of predetermined duration in a manner to be described hereinafter. Both units of the pump 30 (Figs. 3 and 7) discharge into a common tube or bulb 48 which is preferably convoluted in the manner of an S to promote mixture of the liquids drawn from the treating tank and the indicator bottle and thus accelerate the color-forming interaction of the two components, and in order that the two liquids be brought into contact with one another in proportions best suited to produce said coloring effect, the two pump units may be constructed to differ in size in such a manner as to draw the component liquids in appropriate quantities for optimum performance. Thus, in the case of an aqueous solution of sodium hypochlorite tested with a solution of sodium iodide, the capacity of the two pumping units should be so related to one another as to deliver 9 parts of the sodium hypochlorite solution into the mixing bulb for every part of sodium iodide.

Continued operation of the testing pump 30 (Fig. 7) drives the blended liquids from the mixing bulb 48 through a pipe line 50 into another transparent cell 51, to be referred to as indicator cell hereinafter, which is of a construction similar in all respects to the previously described compensating cell 35 except that it is of greater depth in the direction of the diametrically aligned windows 52 and 53 (Figs. 8 and 9) for reasons which will presently appear. After the mixture has passed through the cell 51, it may be discharged through pipe 50a into a sewer or any other suitable place of disposal, as indicated in Fig. 7.

Having specific reference to Figs. 1 and 8, it should be noted that the described cells 35 and 51 are mounted side by side upon the pedestals 36 and 36a, respectively, with the windows 40, 41 and 52, 53 of housings 39 and 39a disposed in diverging planes. A suitable source of light, such as an electric lamp 56 is located at the intersection of said planes and is encased in a housing 57 of metal, or the like, provided with a pair of angularly spaced windows 58 and 59. These windows are arranged to face the windows 40 and 52 on the adjacent side of the housings 39 and 39a, respectively, through suitable tunnels 60 and 61 projecting radially from the housing 57, as best shown in Figs. 8, 9 and 10.

On the other side of the housings 39 and 39a a pair of photo-electric tubes 62 and 63 is disposed in such a manner that light emitted from the lamp 56 through the lineally aligned windows 58, 40, 41 and 59, 52, 53, respectively, impinges upon the light-sensitive electrodes of said tubes, as indicated by the arrows in Fig. 8. These photo-electric tubes are encased in housings 67 and 68 which are made of opaque material, such as brass, each possessing a window 69 or 70, respectively, which communicates with a corresponding window on the diverging side of the housings 39 or 39a through connecting tunnels 71 or 72, respectively. In the following, the tube 62 which is associated with the compensating cell 35 is to be referred to as compensating tube, while the tube 63, which is associated with the indicator cell 51, is to be referred to as indicator tube.

Photo-electric tubes constitute variable resistances whose values decrease with increasing illumination of their light-sensitive electrodes, and, in accordance with the present invention, the two above described photo-tubes 62 and 63 are connected in series to form one branch of a bridge circuit 73, the other branch of which is formed by a plurality of series-connected resistors 74, 75, 76, 77, 78, and 79 (Figs. 5 and 6). When voltage is applied to the opposite ends 80 and 81 of the bridge circuit thus formed, the voltage difference between the junction 82 of the two photo tubes and a selected point 83 of the other branch of said bridge circuit remains constant as long as the resistances constituted by the photo tubes 62 and 63 remain the same or vary in equal proportion. However, as soon as these resistances change disproportionately, the above described voltage will likewise change to an extent determined by the relative change in the values of the tube resistances. In accordance with the present invention, the variations in the voltage difference between points 82 and 83, as developed when the light-sensitive electrodes of said tubes receive varying degrees of illumination, are employed to control operation of the concentrate-replenishing pump 24.

In the embodiment illustrated in the drawings the power required for operating the described bridge circuit is derived from a main power line (Fig. 5) represented by the leads 85 and 86 including a plug 87 for connection to any suitable source of power, such as a light line, and which may contain a main power control switch 88, as shown. The voltage supplied by said line may be raised to the required value by a suitable input transformer 90 comprising a primary 91 and a secondary 92, the latter being connected to the plates of a full-wave-rectifier tube 93 in the conventional manner. The output of the rectifier tube is filtered by means of condensers 94 and 95, and stabilized by resistors 99 and 100 in combination with voltage regulator tubes 101 and 102, respectively. Dropping resistors 103 and 104 may be provided to reduce the stabilized D. C. current to the exact value that may be required at the opposite ends 80 and 81 of the bridge arrangement 73.

The junction 82 of the photo tubes 62 and 63 is connected directly to the control grid 105 of an electrometer tube 106, the filament 107 of which is placed at point 83 between the resistors 77 and 78 in the parallel branch of the bridge circuit 73. The anode circuit of the tube 106 includes a series resistor 109, and the voltage developed across said resistor and resistor 75 is applied to the control grid 110 of a thyratron tube 111. The anode circuit of said thyratron tube includes a relay 116 adapted to close the power circuit of the motor 27 for the concentrate replenishing pump 24. In Fig. 5, this power circuit is represented by a branch 118 extending from the lead 85 of said main power line through the armature 117 of the relay 116 and a motor plug 119 for the motor 27 to the other lead 86 of said main line. A lamp 120 may be shunted across the motor plug 119 to indicate visibly whenever the concentrate-replenishing pump 24 is in operation.

If the voltage supplied from the bridge circuit 73 to the control grid 105 of the electrometer tube 106 rises above a certain predetermined value, the current flow in the anode circuit of said tube places a negative bias upon the control grid of the thyratron tube 111 which renders said tube nonconductive. As a result thereof, the relay 116 in the anode circuit of said tube is unable to close the motor circuit 118 of the concentrate-replenishing pump 24. On the other hand, if the voltage supplied by the bridge circuit 73 to the control grid 105 of the electrometer tube 106 drops below said predetermined value, the current flow in the anode circuit of said tube decreases, causing the bias applied to the control grid of the thyratron tube 111 to shift in positive direction, which renders said tube conductive and permits current to flow in the anode circuit thereof. This energizes the relay 116 which closes the power circuit 118 of the motor 27 and initiates operation of the concentrate-replenishing pump.

In the illustrated embodiment of the present invention said critical voltage is arranged to be slightly negative and power is supplied to the bridge circuit 73 in such a manner that the voltages at the opposite ends 80 and 81 of said circuit are of opposite polarity, with the voltage at point 80 adjacent to the compensating tube 62 being positive and the voltage at point 81 adjacent to the indicator tube 63 being negative. It will be noted that the voltage at point 80 is determined by the voltage dividing network comprising resistors 103 and 74, and the voltage at point 81 is fixed by the voltage dividing network comprising resistors 104, 79, 78, 107, 77, 76, and 75. The values of the resistors in these two voltage dividers have been chosen to provide thyratron tube 111 with a negative bias when the resistances of phototubes 62 and 63 are approximately equal. The resistances of the phototubes may be made equal by causing the same quantity of light to fall on each tube, and an adjustable shutter 121 (Figs. 8, 10, and 11) is provided for the purpose of regulating the quantity of light falling on the compensating tube, so that regardless of the exact strength of a given treating solution, or regardless of the particular depth of color produced by mixing indicator solution and the treating solution, the bridge circuit can be brought into balance by proper manual adjustment of the shutter to cause equal quantities of light to fall on the two phototubes.

This shutter 121 may take the form of a cylindrical surface 121a of opaque material, such as stainless steel, which is rotatably arranged around the compensating tube 62 interiorly of its housing 67. This cylinder has a circumferentially extending aperture or excision 121b of gradually increasing vertical depth which is arranged at the axial altitude of the window 69 in the tube housing 67, as shown in Fig. 10. The cylinder 121a is supported from an axially disposed stud 121c which protrudes through, and is rotatably mounted in, the upper surface of the housing 67. A suitable locking device 121d may be provided to lock the protruding end of the stud 121 and to thereby retain the shutter in adjusted position.

Reverting to Fig. 7, operation of the testing pump 30 draws a specimen of the solution contained in the tank 26 in uncolored condition through the compensating cell 35, mixes it with an appropriate amount of indicator liquid in the mixing bulb 48 and then forces the mixture in colored condition through the indicator cell 51. Now let it be assumed that the solution contained in the tank 26 is of a predetermined concentration of just the strength at which control should occur; that is to say, where any decrease in the concentration should initiate operation of the concentrate-replenishing pump and any increase in the concentration should arrest operation of said pump. To adjust the control system of the invention to this concentration level, the operator turns the shutter 121 manually until it eclipses so much of the light transmitted by the compensating cell 35 that the resistance of the compensating tube 62 is appropriately increased beyond the resistance of the indicator tube 63 as established by formation of indicator color in cell 51, and whenever a point is reached in this adjustment at which the control system exhibits signs of instability, with the pump terminating operation when the shutter is closed further or commencing operation when the shutter is somewhat opened up again, the control mechanism of the invention has been adjusted to the selected concentration level, and the shutter may now be locked in its adjusted position.

Now let it be assumed that the solution collecting in the tank 26 contains considerable quantities of dirt, and like foreign matter in suspension which may reduce the transmission of light of the indicator cell 51 in much the same way as the color formation produced by the indicator liquid in the presence of an adequate amount of germicidal solute. As a result thereof, the resistance of the indicator tube 63 may be maintained at a level that is ordinarily indicative of an adequate degree of concentration even though the concentration of said solution may actually have dropped below the critical minimum required to sterilize fruit or vegetable.

Due to the arrangement of the invention, however, any increase in the resistance of the indicator tube 63 due to the presence of dirt in the solution, is automatically compensated for by a corresponding increase in the resistance of the compensating tube 62 because the contaminated solution passes not only through the indicator cell 51, but also through the compensating cell 35 and reduces its ability to transmit light in the same proportion as in the case of the indicator cell 51. Hence, whenever the tested solution is clouded or obscured by mud and the like, the resistance of both photo tubes rises proportionately so that the voltage output of the bridge circuit 73 at the junction of said tubes remains substantially the same no matter how much the specimen may be contaminated, and is influenced only by color formation resulting from the action of the indicator liquid.

For accurate operation of the described concentration control arrangement, however, it is necessary to make allowance for the fact that after its passage through the balancing cell 35 the contaminated specimen is diluted by the addition of indicator liquid. When the tested solution is thus diluted, a lesser number of dirt particles is likely to be in the path of the light beam passing through the indicator cell 51 than obstructs the path of the light beam passing through the compensating cell 35. As a result thereof, the indicator tube might register a lesser amount of light absorption in the indicator cell corresponding to a lesser amount of color formation than is actually produced by the indicator liquid and in consequence thereof may initiate premature operation of the replenishing pump 24. In accordance with the invention, the indicator cell 51 is, therefore, of greater width in the direction of its light beam than the compensating cell, by a distance which increases the capacity of the former as against the latter in the same proportion in which the volume of the tested solution is increased by the addition of the indicator liquid. As a result thereof, substantially the same number of foreign particles will obstruct the light beam in both the indicator cell 51 and the compensating cell 35, causing the latter to provide perfect compensation for the former no matter how strongly the tested liquid may be contaminated with foreign matter.

The described compensating arrangement provides the same effective remedy for possible inaccuracies due to fluctuations in the brilliance of the light source 56, such as may be caused by irregularities in the power supply because any change in the amount of light received by the indicator tube 63 due to variations in the brilliance of the lamp 56 is accompanied by an equal change in the amount of light received by the compensating tube 62 so that only differences in the formation of color produced by the indicator liquid are effective to vary the voltage output applied to the control grid 105 of the electrometer tube 106, and thus initiate or stop operation of the concentrate-replenishing pump 24.

In accordance with the invention, the described control mechanism may be provided with means to accentuate the changes in the transparency of the indicator cell, as produced by varying degrees of indicator color formation. The indicator coloring most frequently developed in photoelectric concentration control apparatus is yellow or red and its effect upon the visible light spectrum is shown in Fig. 14 wherein transmission of light is plotted against wave length. The curve Y illustrates the light transmission of a transparent liquid of yellow color, the amount of light passed by said liquid being represented by the area below said curve. Curve Y' illustrates the transmission of light of a liquid in which greater color formation has occured. The actual change in the amount of light passed by the two liquids is proportionate to the ratio of the areas within the curves Y and Y'. This ratio is rather small, in spite of a seemingly pronounced shift in the position of the curves, on account of the fact that the areas within the curves Y and Y', differ only to a small extent. To increase this ratio a blue filter 122 may be interposed between the indicator cell 51 and the indicator tube 63, as shown in Figs. 8 and 9, which is arranged to reduce the transmission of the longer wave lengths of the light. The actual amount of light passed to the indicator tube under such conditions is represented by the areas within the resultants of curves Y and b and Y' and b, respectively, which are designated with R and R' in Fig. 14. Hence, in the presence of a blue filter, any change in the amount of light transmitted by the indicator cell, as represented by a shift in the curve Y to Y', amounts to an appreciable percentage of the total amount of light received by the indicator tube effecting a pronounced change in the control illumination supplied to said tube, so that the control mechanism of the invention will positively react even to small changes in the concentration of the controlled solution. To establish comparable conditions at the compensating tube 62, a green filter 123 of appropriate transparency may be interposed between the compensating cell 35, and said tube, as shown in Figs. 8 and 10, since the light transmission characteristic of green is similar in shape and position to the resultants of yellow and blue, as illustrated by curve g in Fig. 14.

Means are provided to operate the described testing arrangement periodically at predetermined intervals. For this purpose, a program motor 124 is mounted upon the upper chassis 21 of the control unit 20 (Figs. 1, 2, and 5) and is arranged to derive power directly from the repeatedly mentioned main line 85, 86 by means of a branch 125 so that it will operate continuously whenever the main power switch 88 is closed. A shaft 126 driven by the program motor 124 carries three rotary cams 127, 128, and 129, respectively, as shown in Figs. 1 and 2, and as diagrammatically indicated in Fig. 5, and is arranged to turn at a very low rate of, say, one-third of a revolution per minute. Each of the cams 127, 128, and 129 is adapted to effect temporary closure of an associated power control switch to individually energize a particular mechanism of the automatic concentration control arrangement of the invention at a predetermined time and for a predetermined duration.

Thus, the cam 127 controls the power supply circuit for the motor 47 of the testing pump 30. In the embodiment illustrated in Fig. 5, this power circuit is represented by a lead 130 connected to the leads 85 and 86 of the main line and including a plug 131 for the motor 47. The cam 127 has a solitary depression 132 adapted to permit a switch 133 to close the power circuit 130 under the force of suitable spring means (not shown) for a time determined by the angular width of said depression, the remaining portion of the cam circumference being elevated to force said switch 133 into an open position. In the exemplary embodiment illustrated in the drawings, the cam depression 132 is shown to extend over an arc of 90 degrees. Assuming the rotary speed of the power shaft 126 to be one-third of a revolution per minute as previously indicated, this means that the testing pump 30 will begin to operate every 180 seconds for a period of 45 seconds to draw a specimen of the solution from the tank 26 and conduct it through the testing cells 35 and 51.

The cam 129 on the continuously rotating shaft 126 of the motor 124 is arranged to control the power supply to the source of light 56 of the above described photo-electric testing arrangement. For this purpose, the cam 129 has a solitary depression 135 of relatively short duration which is arranged to permit a switch 136 to follow the urge of spring means (not shown) and close a power branch 137 (Fig. 5) from the main line 85, 86 through the lamp 56 for a limited period of time.

The depression 135 in the circumference of the light control cam 129 is of materially shorter duration than the depression 132 in the control cam 127 of the testing pump 30, and its angular position relative to the depression 132 is such as to delay illumination of the lamp for some time after the testing pump has commenced operation. In the exemplary embodiment illustrated and described, the depression 135 of the light-control cam 129 is shown to extend over an angle of 30 degrees causing the lamp 56 to light up for a period of 15 seconds every 180 seconds, and the beginning of the depression 135 is angularly displaced relative to the beginning of the depression 132 by an angle of 60 degrees causing the testing pump 30 to operate over a period of 30 seconds, prior to illumination of the lamp 56, so as to thoroughly flush the pipe lines 33 and 45 and the cells 35 and 51 from any residues of a preceding test, before the actual testing operation commences.

The third of the cams mounted upon the continuously rotating power shaft 126 of the motor 124, namely cam 128, possesses a solitary depression 140 which is adapted to permit a switch 141 to temporarily close a power branch 142 from the branch line 118 and main line 86 through the coil 143 of an electromagnet 144. This electromagnet is arranged, upon excitation, to disable a spring latch 145 which tends ordinarily to retain the previously described armature 117 of the relay 116 in a position in which it closes the power circuit of the concentrate replenishing pump 24, whenever said armature is moved into this position by the described relay 116 in the anode circuit of the thyratron tube 111.

The depression 140 in the periphery of the latch-control cam 128 is of smaller duration than either of the depressions 132 and 135 in the contours of the cams 127 and 129, respectively, and its rotary position relative to said depressions is such that its effective phase is situated completely within the effective phase of the light control cam 129. In the particular embodiment illustrated and described, the depression 140 extends over an arc of 10 degrees corresponding to a period of only five seconds during which the electromagnet 144 prevents the latch 145 from retaining the armature 117 in closing position.

Fig. 12 illustrates diagrammatically the duration and relative position of the effective phases of the above described control cams 127, 128, and 129 for one complete program cycle in the operation of the concentration control arrangement of the present invention. The numbers along the abscissa of the diagram represent seconds, 180 seconds being the time which the control cams require for one complete revolution. First the switch 133 (Fig. 5) drops into the depression 132 of the cam 127 and operation of the testing pump 30 commences and continues for 45 seconds, as indicated by line $a$ (Fig. 12). After the pump 30 has operated for a period of 30 seconds, the switch 136 drops into the depression 135 of the light control cam 129 and the lamp 56 lights up rendering the photo-electric testing mechanism effective. As indicated by line $b$, the lamp 56 remains illuminated for a period of 15 seconds and goes out at the same time when the testing pump 30 discontinues operation.

Line $c$ represents the active phase of the latch-disabling magnet 144 as determined by the depression 140 in the circumference of the cam 128 and indicates that the latch 145 is rendered ineffective over only a very limited period which commences after commencement of the operative phase of the photo-electric testing mechanism and ends before termination thereof. After the active phase of the testing pump has come to an end and the lamp 56 has gone out, all the cam peripheries act to keep their respective program switches open for a period of at least 135 seconds, whereupon a new program cycle commences.

With the main line 85, 86 properly connected to a suitable source of power by means of the plug 87 (Fig. 5), operation of the described arrangement is initiated by manually closing the main switch 88 which starts the program motor 124. Said motor continues to operate as long as the concentration control unit of the invention is in use, with each revolution of its power shaft 126 producing a cycle of reoccuring operations. First the switch 133 drops into the depression 132 of the cam 127 and closes the power circuit for the motor 47 of the testing pump 30 causing the latter to draw liquid from the tank 26 and conduct it through the cells 35 and 51. After the testing pump has operated for a time determined by the angular interval between the beginning of the depressions 132 and 135 in the cams 127 and 129, respectively, the light control switch 136 drops into the depression 135 of the cam 129 and closes the power circuit for the lamp 56 causing said lamp to light up and initiate the actual testing operation.

When the main power switch 88 was originally closed to energize the system of the invention, the rectifier tube 93 immediately drew power from the main line through the transformer 90 and supplied a filtered and stabilized D. C. voltage to the points 80 and 81 of the previously described bridge arrangement 73. With the lamp 56 extinguished and the light-sensitive electrodes of the photo tubes 62 and 63 in complete darkness, the resistances formed by said tubes are equal but are so high as to be practically non-conductive. Under such conditions a grid leak resistor 147 (Figs. 5 and 6) of suitable design is arranged to supply a potential to the control grid of the electrometer tube 106 as will enable the anode current of said tube to block the thyratron tube 111 and maintain the relay 116 de-energized. As the lamp 56 lights up and the light emitted by said lamp impinges upon the light sensitive electrodes of the two photo tubes 62 and 63, the resistances constituted by said tubes drop instantaneously to values determined by the transparency of their respective test cells and enable the tubes to assume control of the potential supplied to the control grid of the electrometer tube 106.

Assuming the concentration of the tested solution to be sufficiently high, the voltage developed by the bridge circuit 73 enables the anode circuit of the electrometer tube 106 to place a blocking bias upon the control grid of the thyratron tube 111 and render the relay 116 unable to move its armature 117. Let it now be assumed, however, that the concentration of the solution in the treating tank drops below control-point strength and the voltage developed in consequence thereof by the photo-electric bridge circuit shifts sufficiently in negative direction to cause disappearance of the blocking bias supplied by the anode circuit of the electrometer tube 106 to the control grid of the thyratron tube 111. As a result thereof, said thyratron tube fires and sends a current through the relay 116 which moves its armature 117 into a position in which it closes the power circuit 118 of the pump 24 initiating flow of a new supply of the concentrate into the treating tank to make up for the deficit registered by the photo-electric control mechanism.

As previously explained, the armature 117 of the relay 116 is associated with a spring latch 145, as diagrammatically indicated in Fig. 5.

This latch is adapted to engage said armature 117 whenever it is moved into closed position so that the pump 24 may continue to supply the concentrate into the tank 26 after the lamp 56 has gone out and the photo-electric control circuit 73 has been restored to its condition of rest in which the relay 116 is de-energized. In the illustrated embodiment, a period of 135 seconds will elapse after the lamp 56 has gone out and after the testing pump 30 has ceased to operate, before the testing pump control switch 133 drops again into the depression 132 of its control cam 127 and initiates a new cycle in the operation of the testing mechanism. Again the testing pump 30 draws liquid from the tank 26 and flushes the piping of the control unit 20 for a period of 30 seconds until the lamp 56 lights to adjust the photo-tube resistances according to the intensity of the color formation produced by the indicator liquid in the new specimen. If the test indicates that the concentration of the solution in the tank has meanwhile risen above the control point, the control relay 116 for said pump remains inactive; but the concentrate supply pump will continue to operate since the latch 145 continues to retain the armature 117 in closing position. However, soon after the test lamp 56 has lit up, the switch 141 drops into the depression 140 of its program cam 128 and closes the power line 142 of the latch disabling electromagnet 144 which withdraws the latch 145 from the power-control armature 117 provided armature 117 was closed and that current was flowing through branch 118. In the absence of any attraction from its control relay 116 the armature 117 will now return to its normally open position in which the power supply for the motor of the concentrate-replenishing pump is interrupted, causing the supply of concentrate to the tank 26 to cease.

The depression 140 in the program cam 128 is of smaller width than either of the depressions in the program cams 127 and 129, and the period over which the latch-disabling magnet 144 is energized, is therefore very short and is arranged to end before termination of the illumination period of the test lamp 56, as diagrammatically illustrated in Fig. 12. Therefore, whenever a photo-electric test, performed while the concentrate replenishing pump is in operation, indicates that the concentration in the tank is still subnormal, the resultant activation of the control relay 116 maintains the armature 117 in closed condition during the short period, when the latch 145 is disabled. Hence, upon termination of its ineffective period, said latch may again engage said armature 117 and thus insure uninterrupted operation of the concentrate-replenishing pump 24 for at least another cycle in the operation of the program shaft 126.

The arrangement of the present invention includes automatic means to guard against inappropriately continuing operation of the concentrate-replenishing pump 24, such as would raise the concentration of the treating solution in tank 26 to a degree that may deleteriously affect the texture, taste, and appearance of the treated produce, and which may be caused by failure of the latch disabling electro-magnet 144 to withdraw the latch 145 from the pump-control armature 117 or by a breakdown in the photo-electric control circuit 73, or for any other cause of faulty operation which tends to maintain the concentrate replenishing pump operating. For this purpose, the power circuit 118 of the motor 27 for the replenishing pump includes a device 150 adapted to interrupt said circuit whenever said pump has operated longer than a predetermined period of time, and to maintain said circuit in interrupted condition until it is broken at an additional point exteriorly of said device indicating that the situation has been noticed and attended to by opening the main power switch 88. A device that may be arranged to perform in this manner is an instrument known under the name of "Cramer Time-Delay Instantaneous Re-Set Relay" and, in the following, the construction of such a device will be briefly described. It should be understood, however, that this device is well known in the art and it is the manner in which it is fitted into the organization of the described control unit, rather than its construction, which forms part of the present invention.

Referring to Figs. 5 and 13, a device of the type referred to, comprises a safety switch 151 which is placed into the power circuit 118 of the concentrate-replenishing pump and is normally held in closed position by spring means (not shown). In addition, the device comprises a control motor 152 which is shunted across the the motor plug 119 of the concentrate-replenishing pump through a normally closed switch 153. A normally disengaged clutch 154 is arranged to establish operating connection between said control motor 152 and a control arm 155 (indicated in broken lines) whenever said clutch is engaged by operation of an electromagnet 156 which is shunted across the power lines 85 and 86 through switch 117. The control arm 155 is arranged to open both said switches 151 and 153 whenever it has been advanced by the motor 152 over a predetermined distance, but is normally held in an initial position removed from said switches by a suitable spring means (not shown).

Whenever the photo-electric control system 73 energizes the relay 116 which moves the armature 117 into closed position and thus initiates operation of the motor 27 of the concentrate replenishing pump, power will also flow through the control motor 152 causing said motor to commence operation. In addition, actuation of the armature 117 initiates flow of power through the shunt line which contains the electro-magnet 156 and thus causes engagement of the clutch 154. This establishes driving connection between the operating motor 152 and the control arm 155 so that the latter will move toward the switches 151 and 153. Thus, whenever the armature 117 keeps the circuit 118 closed beyond a predetermined period of time, said arm 155 reaches the switches 151 and 153 and throws them open. This terminates operation of the concentrate replenishing pump 24 and, in addition, terminates operation of the control motor 152. However, the clutch control electro-magnet 156 remains energized as long as the armature 117 remains in closed position and, therefore, maintains the control arm 155 in rigid connection with the motor 152 so that said arm is unable to return to its initial position under the force of its restore spring and, therefore, continues to keep the switches 151 and 153 in open positions. Since the source of power for electro-magnet 144 is removed when switch 151 is opened, the latch 145 is held inoperative and armature 117 will not open. Hence, the electro-magnet 156 is de-energized only when the manually operable main power switch 88 is opened which indicates that the abnormal condition of the apparatus has been noticed and is being properly attended to. The clutch 154 is disengaged by the opening of the main switch 88 permitting instantaneous return of the control arm 155 to its initial position which, in turn, permits restoration of the switches 151 and 153 to their normally closed positions, and thus reconditions the described safety device for a new operational cycle. The described device 150 may be provided with a manually adjustable setting lever 157 (Fig. 1) to pre-set the period of time that may elapse before its control arm 155 opens the safety switch 151.

The described arrangement positively prevents uncontrolled operation of the concentrate-replenishing pump, such as is liable to deliver excessive amounts of the concentrate into the treating tank and thus effectively protects the treated produce from any injury due to excessive concentration of the treating solution. Since it may be necessary, however, to have the concentrate-replenishing pump operate uninterrupted for an extended period of time at the beginning of a sterilizing process, to prepare the proper solution in the treating tank, a manually operable shunt switch 158 (Fig. 5) is provided to connect the motor plug 119 directly across the main power line 85 and 86 and permit operation of the concentrate-replenishing pump for any desired period of time without interference from any of the described control or safety mechanisms. Furthermore, the safety switch 151 may be arranged to energize a red lamp 159 (Figs. 2, 5, and 13) or some other signalling means, when opened to interrupt the power circuit of the concentrate replenishing pump, so as to warn personnel in attendance that the control unit 20 is out of operation.

It will be understood that a concentration control unit of the type described would be completely disorganized and may come to lasting harm if either of the light-transmitting cells 35 or 51 should develop a leak. In such a case, continued operation of the testing pump 30 would cause the escaping liquid to spread over the upper chassis and seep into the interior of the apparatus which may seriously damage the components thereof and is liable to cause dangerous short circuits of its electric wiring connections. The arrangement of the present invention, therefore, comprises means adapted instantaneously to stop operation of both the testing and the replenishing pumps, if ever a leak should develop in one of the light-transmitting cells.

For this purpose, a ring or collar 160 of conductive material, such as stainless steel, is arranged near the top of each of the pedestals 36 and 36a. These collars are of such size as to be situated exteriorly of the transparent cells but are sufficiently smaller in diameter than the metal housings 39 and 39a to be radially spaced therefrom, as shown in Figs. 8, 9, and 10. While the metal shells 39 and 39a are connected to ground, as diagrammatically indicated in Fig. 5, a suitable conductor 161 extending through the interior of the pedestal (Figs. 9 and 10) connects the collar 160 of each of said cells directly to the control grid 162 of a thyratron tube 163, the anode circuit of which includes a relay 164 that is adapted, upon excitation, to simultaneously open two normally closed switches 165 and 166 situated in the power lines 118 and 130 of the replenishing pump 24 and the testing pump 30, respectively.

Normally, the control grid 162 of the thyratron tube 163 is supplied with a biasing potential adapted to block said tube and prevent current flow in the anode circuit thereof so that the relay 164 is unable to open the switches 165 and 166. However, as soon as one of the cells 35 or 51 develops a leak, the escaping solution establishes conductive connection between the collar 160 and the cell housing 39 or 39a of the defective cell so that the control grid 162 of the thyratron tube 163 is effectively connected to ground. This abolishes the blocking potential normally applied to said grid and causes said tube 163 to fire. The resultant current flow in the anode circuit of said tube energizes the relay 164 which opens the switches 165 and 166 and thus interrupts the power supply for both the testing pump and the concentrate-replenishing pump. Hence, said pumps are unable to operate until the damage has been repaired and there is no danger for the testing pump to force liquid through the leak in the defective cell over and into the control unit or for the photo-electric control circuit to become disorganized and cause the replenishing pump to deliver excessive amounts of the concentrate into the treating tank 26.

The safety switch 166 in the power circuit 130 of the testing pump 30 may be arranged to close a shunt line 167 through a warning light 168, whenever it is opened by the relay 164 in the manner described above, to indicate to attending personnel that the testing pump is out of commission and requires expert attention.

In the particular embodiment illustrated in Fig. 5 the blocking potential for the control grid 162 of the thyratron tube 163 is derived directly from the heater 170 of said tube. For this purpose, the arrangement is such that one side of said heater is grounded to the cathode 171 of the tube while its other side is connected to the control grid 162 through a conductor 173 which may include the resistors 174 and 175, and the heater is powered by an alternating voltage of opposite phase to the voltage applied to the anode 176. Thus, whenever a positive voltage appears at the anode 176 of the thyratron tube, the conductor 173 supplies a negative voltage to the control grid 162, as illustrated in Fig. 15, wherein curve $a$ represents the alternating voltage appearing between the anode 176 and the cathode 171 while curve $h$ represents the oppositely alternating voltage supplied by the ungrounded side of the heater 170. To prevent accidental firing of the tube at those intersections of curves $a$ and $h$, where the anode voltage builds rapidly up in positive direction while the negative bias supplied by the heater is still very small, means may be provided in the form of a condenser 177 shunted across the resistor 175 to somewhat advance the alternating phases of the voltage supplied to the control grid, as illustrated by curve $g$ which indicates that the biasing voltage on the control grid 162 drops to an appreciable negative value before a positive potential appears at the anode of said tube.

Means may also be provided to automatically terminate operation of both the testing pump and the replenishing pump whenever the supply of indicator liquid in the reservoir 46 is exhausted because continued operation of the control unit 20 without an adequate supply of indicator liquid would falsely register insufficient concentration of the treating solution, due to lack of color formation in the indicator cell 51, and would thus cause untimely operation of the concentrate replenishing pump. For this purpose, the previously described conductor 173 which delivers the biasing potential to the control grid 162 of the thyratron tube 163 may be interrupted with its severed ends located at a predetermined level in the indicator bottle 46, as diagrammatically indicated at 180 in Fig. 5.

As long as the severed ends of the conductor 173 are immersed in the indicator liquid, they are conductively connected so that the control grid 162 of the thyratron tube 163 remains properly biased to block said tube. However, as soon as the supply in the indicator reservoir drops below the level of the severed ends of conductor 173, the biasing connection between the heater and grid of the thyratron tube 163 is disrupted and the blocking bias on the control grid 162 of said tube disappears. As a result thereof, the tube fires and energizes the relay 162 which opens the safety switches 165 and 166 of both the testing and the replenishing pumps and illuminates the warning light 168 in the manner previously described. The pumps are kept out of operation until the supply of indicator liquid in the bottle 46 has been sufficiently replenished to cover the severed ends of the conductor 173 which reestablishes the blocking bias at the control grid of the thyratron tube 163 and thus inactivates the relay 164. In consequence thereof, the safety switches 165 and 166 may follow the urgency of suitable restoring springs (not shown) and close the power circuits for the testing and replenishing pumps and the control unit may resume its normal operation.

The manner of operation and the manipulation of the control unit of the invention will be apparent from the above given explanations. Briefly, the intake and discharge pipes of the concentrate replenishing pump 24 are connected to the concentrate reservoir 25 and the treating tank 26, respectively, and the intake pipe of the testing pump unit 31 is, likewise, connected to the treating tank 26 while the intake pipe of the unit 32 is connected to the indicator liquid bottle 46. The main power plug 87 is then connected to some suitable source of power, such as a light line, and the switch 88 is closed, whereupon the unit commences operation. To condition the unit for operation with a particular solution, the treating tank should first be filled with said solution in a state of concentration representative of the desired control point, and during the operative phases of the testing pump 30 and the lamp 56, the operator manipulates the adjustable shutter 121 of the compensating photo-tube 62 until an unstable condition of the concentrate-replenishing pump 24 indicates that the voltage developed by the photo-electric control circuit 73 with an indicator color formation as produced by the exemplary concentration of the solution is of just the right magnitude and character to prevent operation of the concentrate replenishing pump but will initiate such operation should the color formation diminish. From then onward control of the solution in the treating tank may be left entirely to the unit 20 which will maintain it within its proper limits, no matter how much the transparency of the liquid may vary due to contamination by dirt or other impurities. All that an attendant has to do, is to glance occasionally at the various lights of the unit. If the lamp 120 is illuminated, he is informed that the concentration of the solution has dropped below the control point and is being raised to its proper level by operation of the concentrate replenishing pump. If the lamp 159 lights up, it tells him that the control unit has suspended its function due to excessively long operation of the concentrate replenishing pump and requires attention. If the lamp 168 lights up, it tells him that the supply in the indicator bottle has been exhausted and needs replenishment before it can resume its control of the solution, or that one of the cells 34 and 51 has become defective and requires repair.

In a practical embodiment of the present invention the components employed in the electrical system in Fig. 5 were as follows:

*Photo-electric control apparatus*

| | |
|---|---|
| Tubes 62, 63 | Photo-tubes type 441. |
| Tube 93 | Full wave rectifier tube type 117Z6–GT. |
| Tubes 101, 102 | Voltage regulator tube type VR75. |
| Tube 106 | Electrometer tube type X41. |
| Tube 111 | Thyratron tube type 502A. |
| Transformer 90 | 115 v. 60 cycle primary 91. 230 v. 60 cycle secondary 92. 6.3 v. 60 cycle secondary 92'. |
| Condenser 94, 95 | 16 mfd. |
| Condenser 96 | 8 mfd. |
| Condenser 97 | .001 mfd. |
| Condenser 98 | 10 mfd. |
| Resistor 74 | 1300 ohms. |
| Resistor 75 | 100 ohms. |
| Resistor 76 | 150 ohms. |
| Resistor 77 | 450 ohms. |
| Resistor 78 | 150 ohms. |
| Resistor 79 | 1850 ohms. |
| Resistors 99, 100 | 1500 ohms. |
| Resistor 103 | 6200 ohms |
| Resistor 104 | 4800 ohms. |
| Resistor 109 | 150,000 ohms. |
| Resistor 112 | 10,000 ohms. |
| Resistor 113 | 0.5 megohm. |
| Resistor 114 | 500 ohms. |
| Resistor 147 | 100 megohms. |
| Relay 116 | Struthers-Dunn type 51AXX10 latching relay. |

*Leak detector mechanism*

| | |
|---|---|
| Tube 163 | Thyratron tube type 502A. |
| Transformer 190 | 115 v. 60 cycle primary 191. 115 v. 60 cycle secondary 192. |
| Condenser 177 | .01 mfd. |
| Condenser 193 | 10 mfd. |
| Resistor 174 | 3 megohms. |
| Resistor 175 | 1 megohm. |
| Resistor 194 | 2 megohms. |
| Resistor 195 | 500 ohms. |
| Relay 164 | Struthers-Dunn type 1XAA16 relay. |
| Voltage of main line 85, 86 | 115. |

The photo-electric testing apparatus of the present invention may be employed to indicate or control relations other than those of solute and solvent. Thus, Fig. 16 illustrates a modified embodiment of the photo-electric testing apparatus which is arranged to indicate automatically the thickness of a transparent coat of paint or varnish applied to a base of cardboard, wood, or the like, which may in itself be of a variable color pattern. As in the previously described embodiment a balancing tube 201 and an indicator tube 202 are connected in series to form one branch of a bridge circuit 203, the other branch of which is formed by a number of series connected resistors 204 and 205, respectively, with the operating voltage being applied at the junction points 207 and 208 of the two branches.

The surface to be provided with a coat of varnish is represented by a sheet of cardboard 210 which is moved past the two photo-tubes in the direction from the balancing tube 201 to the indicator tube 202, as shown by the arrow 211. A suitable source of light, such as the lamp 212, is positioned intermediately of the two photo-tubes and is provided with a pair of adjustable windows, indicated at 214 and 215, respectively, which are arranged to direct a pair of diverging light beams against the surface 210 in such a manner that said beams are reflected onto the light-sensitive electrodes of the balancing tube and the indicator tube, respectively, as shown by the arrows drawn in broken lines.

Arranged intermediately of the points at which the two light beams impinge upon the surface 210 is a spray nozzle 220 through which a layer of paint or varnish 221 is applied to said moving surface 210. In case the arrangement is such that the output volume of the spray nozzle 220 is manually controlled, a suitable indicator device 222, such as a galvanometer, a vacuum tube voltmeter or a self-balancing potentiometer, is connected between the junction points 223 and 224 of the photo-tubes 201, 202 and the resistors 204, 205, respectively, and is provided with a calibrated scale 225 that may bear the notations "High" and "Low."

In practical operation the amount of light transmitted to the light-sensitive electrode of the indicator tube 202 varies according to the thickness of the coating formed on the surface 210, that is to say, it decreases as said thickness increases and increases as it decreases. The resultant changes in the resistance of the indicator tube cause corresponding shifts in the voltage developed between the control points 223 and 224 of the bridge circuit 203 which move the needle in the indicator device 222 from an initially established standard position to positions indicating greater or lesser thickness, as the case may be. To guide the operator of the spray nozzle, the above described notations "High" and "Low" on the scale 225 of the indicator device may be provided at points representative of critical lower or upper limits for the thickness of the coat 221.

Let it now be assumed that the travelling surface 210 to which the varnish is applied, changes its hue and becomes darker. Since this reduces the amount of light reflected to the indicator tube 202 and thus causes an increase in the resistance of said tube, such a change in the appearance of the surface 210 would ordinarily cause a shift in the voltage output of the bridge circuit 203 that incorrectly indicates an increase in the thickness of the coat 221 formed on the surface 210. In the described arrangement, however, such a change in the appearance of the surface 210 produces a corresponding decrease in the amount of light reflected to the compensating tube 201 and, hence, increases the resistance of said tube accordingly so that the voltage output of the bridge circuit 203 is maintained at its previous level. The same effective compensation occurs whenever the surface 210 changes to a brighter hue in that a greater amount of light is reflected to the compensating tube as well as the indicator tube. Thus, the needle of the indicator device 222 will not respond to any changes in the hue or color of the treated surface but will change its position only when the thickness of the coating varies, enabling the operator to re-adjust the output volume of the spray nozzle or regulate the speed at which the surface travels past said nozzle in such a manner as to maintain the thickness of the coating within the required limits.

It will be understood that automatic mechanisms similar in nature to those employed in connection with the previously described concentration control unit may be provided to actuate the volume control means of the spray nozzle 220 or regulate the speed of travel of the surface 210 in response to the varying control voltages developed by the photo-electric testing circuit illustrated in Fig. 16.

While I have described a preferred apparatus for carrying out the present invention, it will be understood that its constructional details may be varied without departing from the spirit and scope of the claims appended hereto.

Having thus described the present invention, what I claim as new and desire to protect by Letters Patent is:

1. A concentration control unit for solutions including replenishing means adapted to increase the concentration of a controlled solution, a photo-electric testing mechanism having an activating lamp, sampling mechanism arranged to conduct specimens of said solution through said testing mechanism, said testing mechanism being arranged to develop varying voltages according to the concentration of said specimens upon illumination of said lamp, a relay adapted to activate said replenishing means in response to predetermined ones of said voltages, latching means to retain said relay in said activating position upon disappearance of said voltages, means adapted to disable said latching means, and cyclically operable means to periodically activate said sampling mechanism, said lamp and said latch-disabling means.

2. A concentration control unit for solutions, including replenishing means adapted to increase the concentration of a controlled solution, photo-electric testing mechanism having an activating lamp, sampling mechanism arranged to conduct specimens of said solution through said testing mechanism, said testing mechanism being arranged upon illumination of said lamp to develop different voltages according to the concentration of said specimens, a relay adapted to activate said replenishing means in response to predetermined ones of said voltages, latching means adapted to retain said relay in activating position upon disappearance of said voltages, means adapted to disable said latching means, cyclically operable means to periodically activate said sampling mechanism for a limited period of time, cyclically operable means to periodically activate said lamp for a period of shorter duration than the operative phase of said sampling mechanism, and cyclically operable means to periodically activate said latch-disabling means for a period of shorter duration than, and situated wholly within, the operative phase of said lamp.

3. A concentration control unit for solutions contained in a tank, comprising a replenishing pump adapted to deliver a concentrate of said solution into said tank and having a normally open power circuit, a photo-electric control mechanism having an activating lamp, a sampling pump arranged to conduct specimens of said solution through said testing mechanism, said testing mechanism being arranged to develop different voltages according to the concentration of said specimens, a relay responsive to selected ones of said voltages indicative of sub-standard concentration of said specimens to close said power circuit for said replenishing pump, a latch adapted to retain said relay in said closing position upon disappearance of said voltages, an electromagnet adapted to disable said latch, and cyclically operable means arranged to periodically activate said sampling pump, said lamp and said electromagnet in the sequence named over overlapping periods of unequal duration.

4. A concentration control system for solutions comprising a replenishing pump having a normally open power circuit, a photo-electric testing arrangement having a lamp adapted to activate said arrangement upon illumination thereof and a sampling pump arranged to conduct specimens of a controlled solution through said photo-electric testing arrangement, said arrangement being adapted upon activation to develop different control voltages according to the concentration of said specimens, cyclically operable means to activate said sampling pump and illuminate said lamp at periodic intervals to develop said control voltages for limited periods of time, mechanism responsive to selected ones of said control voltages to close said power circuit for said replenishing pump, latching means effective to retain said mechanism in closing position upon disappearance of said voltages, cyclically operable means briefly effective during reappearance of said control voltages to disable said latching means and permit said mechanism to interrupt said power circuit whenever said reappearing voltages differ from said selected voltages.

5. A testing arrangement for liquids comprising a hollow transparent cell, a pump arranged to conduct liquid through said cell, a power circuit for said pump, a relay operable to open said power circuit, a circuit including a pair of relatively spaced conductive elements situated adjacent to said cell exteriorly thereof, said circuit being effective upon collection of liquid in the space between said elements to activate said relay.

6. Arrangement according to claim 5 wherein one of said elements is a metal housing enveloping said transparent cell and the other one of said elements is an annular metal collar situated within said housing and surrounding said cell near the bottom thereof.

7. In a testing arrangement having a transparent hollow cell, a pump arranged to conduct liquid through said cell and a power circuit for said pump, mechanism for suspending operation of said pump in the event of leakage from said cell comprising an electronic tube having a control grid, said grid being ordinarily biased to block said tube, a relay situated in the anode circuit of said tube, and operable to interrupt said pump circuit, and means adapted upon escape of liquid from said cell to effectively connect said grid to ground.

8. A testing arrangement for liquids including a hollow transparent cell, a metal housing encasing said cell, said housing being connected to ground, a pump arranged to conduct liquid through said cell, a power circuit for said pump, an electronic tube having a control grid, said grid being ordinarily biased to block said tube, a relay situated in the anode circuit of said tube and operable to interrupt said power circuit, and a conductor leading from said control grid to a point adjacent to, but out of contact with, said housing and near the bottom of said cell, in order that liquid leaking from said cell may electrically bridge the gap between said conductor and said housing and in this manner connect the control grid of said electronic tube to ground.

9. Arrangement according to claim 8 including a warning light, adapted to be illuminated by operation of said relay, to visibly indicate leakage from said cell and consequent suspension of said pump.

10. In a testing arrangement for solutions having a transparent hollow cell, a reservoir containing indicator liquid, a pump arranged to mix specimens of a tested solution with measured quantities of said indicator liquid and conduct said specimens through said cell, and a power circuit for said pump, mechanism for suspending operation of said pump in the event of leakage from said cell, comprising a thyratron tube having an anode, a control grid, a cathode, and a heater, one side of said heater being grounded to said cathode, means for applying an alternating voltage to said anode, means for applying an alternating voltage of opposite phase to said heater, and a first conductor connecting the ungrounded side of said heater to said control grid to supply a blocking potential to said grid, a relay situated in the anode circuit of said tube and operable to open the power circuit for said pump, and an ordinarily interrupted second conductor arranged in uninterrupted condition to connect said control grid to ground, the interruption of said second conductor being located closely adjacent to said transparent cell near the bottom thereof to be conductively bridged by any liquid that may escape from said cell.

11. Arrangement according to claim 10 wherein said first conductor is likewise interrupted with the severed ends thereof situated at a predetermined level within the reservoir containing said indicator liquid in order to suspend operation of said pump whenever the supply of said indicator liquid drops below said predetermined level.

WESLEY N. LINDSAY.

References Cited in the file of this patent

UNITED STATES PATENTS

| Number | Name | Date |
|---|---|---|
| 1,893,462 | Wait | Jan. 3, 1933 |
| 1,914,937 | Bodine | June 30, 1933 |
| 1,940,028 | Staley | Dec. 19, 1933 |
| 1,940,772 | Schoenberg | Dec. 26, 1933 |
| 2,003,819 | Archer | June 4, 1935 |
| 2,019,871 | Pettingil | Nov. 5, 1935 |
| 2,063,140 | Allison | Dec. 8, 1936 |
| 2,067,440 | Finney | Jan. 12, 1937 |
| 2,122,824 | Pick | July 5, 1938 |
| 2,171,312 | Meyers | Aug. 29, 1939 |
| 2,219,496 | Staley | Oct. 29, 1940 |
| 2,232,622 | Moses | Feb. 18, 1941 |
| 2,260,312 | Gruman | Oct. 28, 1941 |
| 2,262,573 | Bender | Nov. 11, 1941 |
| 2,372,489 | Hampson | Mar. 27, 1945 |
| 2,429,066 | Ruenni | Oct. 14, 1947 |
| 2,431,899 | Wolf | Dec. 2, 1947 |
| 2,431,923 | Dimmick | Dec. 2, 1947 |
| 2,437,715 | Thorp | Mar. 16, 1948 |
| 2,452,122 | Gumaer | Oct. 26, 1948 |
| 2,459,551 | Steinitz | Jan. 18, 1949 |